Patented Apr. 26, 1932

1,855,302

UNITED STATES PATENT OFFICE

HANS MAUSS, OF WUPPERTAL-BARMEN, GERMANY, ASSIGNOR TO WINTHROP CHEMICAL COMPANY, INC., OF NEW YORK, N. Y., A CORPORATION OF NEW YORK

NEW ACRIDINE DERIVATIVES

No Drawing. Application filed March 26, 1931, Serial No. 525,595, and in Germany April 2, 1930.

The present invention relates to new 2-alkoxy-6.9-dihalogen acridines of the probable formula:

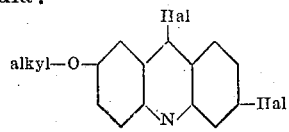

wherein Hal stands for a halogen atom, and to a process of preparing same.

In accordance with my present invention 2-alkoxy-6.9-dihalogen acridines are obtainable by condensing a 2.4-dihalogen benzoic acid with a 4-alkoxy-aniline to a 4-alkoxy-3'-halogen-diphenylamine-6'-carboxylic acid preferably by heating the components with each other in the presence of an alkaline medium, such as potassium or sodium carbonate or hydroxide, and of a copper catalyst, such as copper metal or a suitable salt thereof, such as copper chloride, copper acetate and the like, treating the 4-alkoxy-3'-halogen-diphenylamine-6'-carboxylic acid with an agent known to transform carboxylic acids into the corresponding carboxylic acid halides, such as phosphorus halides or thionylchloride, condensing the corresponding acid halide formed by means of aluminium chloride to a 2-alkoxy-6-halogen-acridone and transforming the latter by means of a halogenating agent, in particular of a phosphorus halide, respectively of phosphorus and iodine into a 2-alkoxy-6.9-dihalogen acridine, the reactions presumably occurring in accordance with the following reaction scheme:

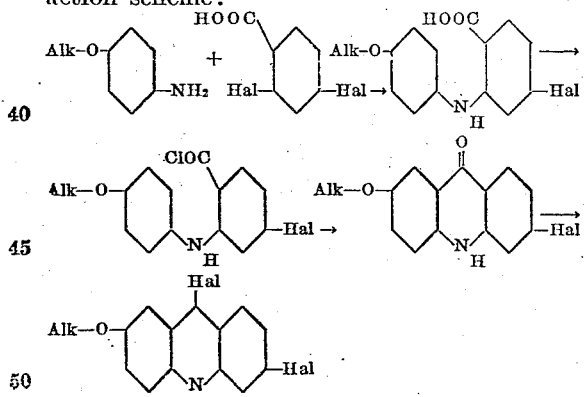

In this manner, for example, the methyl, ethyl, isopropyl, allyl, butyl, crotyl, isoamyl, hexyl ether of 2-hydroxy-6.9-dihalogen-acridines may be prepared, the two halogen atoms being similar or dissimilar, as, for example, in 2-hydroxy-6.9-dibromo-acridine, 2-hydroxy-6-iodo-9-bromo-acridine and the like.

The new compounds are yellow colored, crystalline substances of weakly basic character; they are insoluble in water and dissolve in the customary organic solvents and are intermediate products for the manufacture of therapeutic media, preferably those products wherein the alkyl group is methyl or ethyl.

The following examples illustrate the invention without restricting it thereto:—

Example 1

(a) 123 grams of 4-anisidine are condensed with 191 grams of 2.4-dichlorobenzoic acid in 750 ccs. of amylalcohol at the boil with the addition of 138 grams of potassium carbonate and 2 grams of copper bronze. After about 5 hours boiling, the reaction is complete. To the almost black solution are added 100 ccs. of 33% caustic soda and the amylalcohol and any uncondensed anisidine are distilled off in a current of steam. The alkaline solution remaining is clarified by means of animal charcoal, filtered and run slowly while stirring into hydrochloric acid, cooled with ice. The crude 4-methoxy-3'-chlorodiphenylamine-6'-carboxylic acid is thereupon precipitated in satisfactory yield as a bluish green powder. By using an excess of the starting base, the yield can be raised to approach the calculated value.

By crystallization from alcohol, small pale yellow needles melting at 214–215° C. can be obtained. The acid dissolves with difficulty at room temperature, but readily on boiling in alcohol, benzene, glacial acetic acid and acetone. On heating above the melting point, it is converted with loss of carbon dioxide into 4-methoxy-3'-chlorodiphenylamine.

(b) 100 grams of the well dried crude acid are suspended in 1000 ccs. of benzene, 80 grams of phosphorus pentachloride are introduced and the whole is heated to boiling for one hour. After cooling to an internal temperature of +10° C. 100 grams of aluminium chloride are added in portions with stirring during which addition the temperature should not exceed 45° C. and the reaction mass is stirred for 3 hours. Thereupon it is poured on to ice, acidified with 100 ccs. of concentrated hydrochloric acid, and the benzene is removed in a current of steam. The 2-methoxy-6-chloro-acridone is separated by filtering with suction from the acid suspension and purified by repeated extraction with hot dilute caustic soda. The yield is very satisfatory. The product is sparingly soluble in most organic solvents and possesses only weak basic properties; it dissolves readily in alcoholic caustic alkalies. Its melting point lies above 270° C.

(c) 259.5 grams of 2-methoxy-6-chloroacridone are made into a paste in 1200 ccs. of chlorobenzene, 208 grams of phosphorus pentachloride are added and heating to boiling is effected for one hour with vigorous stirring. After cooling strongly, the product is decomposed by means of 10% ammonia with the addition of ice, the yellow precipitate is filtered with suction and purified by crystallization from benzene. The 2-methoxy-6.9-dichloroacridine thus produced crystallizes in fine yellowish needles, which melt at 160–161° C. It is fairly readily soluble in alcohol, benzene, toluene and glacial acetic acid, more difficulty soluble in ether, acetone and ligroin.

The same product is obtained in a very good yield by reacting upon a solution of 259.5 grams of 2-methoxy-6-chloroacridone in 1500 ccs. of benzene with 160 grams of phosphorus oxychloride. Good results are likewise obtained by employing thionylchloride in the chlorination process.

2-methoxy-6-chloro-9-iodoacridine is obtainable by introducing iodine into a suspension of 26 grams of 2-methoxy-6-chloroacridone and 3 grams of red phosphorus in 200 ccs. of chlorobenzene while strongly stirring the mixture and heating it to the boiling point until the iodine is no longer taken up. By working up in the manner above described for the dichloro compound and recrystallizing the crude product from benzene, 2-methoxy-6-chloro-9-iodoacridine is obtained in yellow needles, melting at 211–212° C. It is not as easily soluble as the 2-methoxy-6.9-dichloroacridine.

By reacting with phosphorus pentabromide upon 2-methoxy-6-chloroacridone the 2-methoxy-6-chloro-9-bromo-acridine is obtained in an analogous manner to that described above, showing after the recrystallization from benzene the melting point of 181–182° C.

*Example 2*

(a) Under the conditions described in Example 1 (under a) 4-ethoxy-3'-chlorodiphenylamine-6'-carboxylic acid is obtained in satisfactory yield by condensing 137 grams of 4-phenetidine with 191 grams of 2.4-dichlorobenzoic acid in 750 ccs. of amylalcohol with the addition of 138 grams of potassium carbonate and 2 grams of copper powder. The acid crystallizes from benzene with a melting point of 224–225° C. The solubility properties are similar to those of the methoxy compound described in Example 1 (under a).

(b) 2-ethoxy-6-chloroacridone is obtained as a yellowish powder likewise in very satisfactory yield in accordance with the directtions given in Example 1 (under b). This product is distinguished by its sparing solubility in most organic solvents; like the methoxy compound, it possesses only weakly basic properties and like this also dissolves in alcoholic caustic alkalies. Its melting point lies above 270° C.

(c) 2-ethoxy-6.9-dichloroacridine is produced in a manner similar to that described in Example 1 (under c). It displays solubility properties similar to those of the corresponding methoxy compound and crystallizes from benzene in beautiful yellowish needles melting at 162–163° C.

*Example 3*

(a) 235.5 grams of 2-chloro-4-bromobenzoic acid are heated with 123 grams of 4-anisidine in 750 ccs. of amylalcohol at the boil with the addition of 5 grams of copper bronze and 138 grams of potassium carbonate. After 6 hours boiling the reaction is complete and the mixture is worked up as indicated in Example 1 (a). The crude 4-methoxy-3'-bromo-diphenylamine-6'-carboxylic acid which is obtained in a very good yield crystallizes from alcohol in yellowish-green needles, which melt at 212–213° C. It displays solubility properties similar to those of the corresponding chloro compound.

(b) The ring closure to the corresponding acridone is performed, in an analogous manner to that of Example 1 (b) and takes place exceedingly smoothly. The 2-methoxy-6-bromoacridone crystallizes from aniline as a yellow powder. Its melting point lies above 270° C. It is difficultly soluble in the customary solvents.

(c) 304 grams of 2-methoxy-6-bromoacridone are treated in 1200 ccs. of chlorobenzene with 208 grams of phosphorus pentachloride and the reaction product is worked up in accordance with the directions given in Example 1 (c). The 9-chloro-6-bromo-2-methoxyacridine crystallizes from benzene or benzine in yellowish, felted crystals, which melt at 160–161° C.

*Example 4*

(a) In an analogous manner by heating equimolecular quantities of 2-chloro-4-iodobenzoic acid, which crystallizes from water in thin white needles, melting at 167–168° C., and 4-anisidine in amylalcohol for 6 hours with the addition of potassium carbonate and copper bronze 4-methoxy-3'-iododiphenyl-amine-6'-carboxylic acid is obtained. The latter crystallizes from water in yellowish-green needles, which decompose at 219–220° C.

(b) 2-methoxy-6-iodoacridone is produced in accordance with the directions given under 1 (b). It precipitates from aniline as a yellow powder, melting above 270° C. and is difficultly soluble in the usual organic solvents just as the corresponding chloro-or -bromoacridone.

(c) 351 grams of 2-methoxy-6-iodoacridone are heated to boiling with 208 grams of phosphorus pentachloride in 1200 ccs. of chlorobenzene for 1 hour. When the reaction mass is well cooled the hydrochloride of the 9-chloro-6-iodo-2-methoxyacridine is filtered with suction and decomposed with diluted ammonia. The base crystallizes from benzene in yellow needles, melting at 164–165° C. It displays similar properties to the corresponding 6-chloro-or 6-bromo-derivative.

I claim:—

1. The process which comprises heating a 2.4-dihalogen benzoic acid with a 4-alkoxy-aniline in the presence of an alkaline reacting medium and of a copper catalyst, transforming the 4-alkoxy-3'-halogen-diphenyl-amine-6'-carboxylic acid formed by means of an agent, capable of transforming carboxylic acid—into carboxylic acid—halide-groups, into the corresponding acid halide, condensing the acid halide by means of aluminium chloride to a 2-alkoxy-6-halogen-acridone and acting upon the latter with a halogenating agent to form a 2-alkoxy-6.9-dihalogen-acridine.

2. The process which comprises heating a 2.4-dihalogen benzoic acid with a 4-alkoxy-aniline in a solvent in the presence of an alkali metal carbonate and of copper, transforming the 4-alkoxy-3'halogen-diphenyl-amine-6'-carboxylic acid formed by means of a phosphorus halide into the corresponding acid halide, condensing the acid halide by means of aluminium chloride to a 2-alkoxy-6-halogen-acridone and acting upon the latter with a phosphorus halide to form a 2-alkoxy-6.9-dihalogen-acridine.

3. The process which comprises heating a 2.4-dihalogen benzoic acid with a 4-alkoxy-aniline in an organic solvent in the presence of an alkali metal carbonate and of copper, transforming the 4-alkoxy-3'-halogen-diphenylamine-6'-carboxylic acid formed by means of phosphorus pentachloride into the corresponding acid chloride, condensing the acid chloride by means of aluminium chloride to a 2-alkoxy-6-halogen-acridone and acting upon the latter with phosphorus pentachloride to form a 2-alkoxy-6-halogen-9-chloroacridine.

4. The process which comprises heating one mol of a 2.4-dihalogen-benzoic acid with about one mol of a 4-alkoxy-aniline in an organic solvent in the presence of about one mol of an alkali metal carbonate and of a small amount of copper bronze, transforming the 4-alkoxy-3'-halogen-diphenylamine-6' carboxylic acid formed after dissolving in an organic solvent indifferent to the reacting media, by means of about one mol of phosphorus pentachloride into the corresponding acid chloride and condensing the acid chloride by means of about 2 mols of aluminium chloride into a 2-alkoxy-6-halogen-acridone, heating the latter in the presence of an organic solvent indifferent to the reacting media with one mol of phosphorus pentachloride to form a 2-alkoxy-6-halogen-9-chloro-acridine.

5. The process which comprises boiling one mol of a 2.4-dihalogen-benzoic acid with about one mol of a 4-alkoxy-aniline in amylalcohol in the presence of about one mol of an alkali metal carbonate and a small amount of copper bronze, transforming the 4-alkoxy-3'-halogen-diphenylamine-6'-carboxylic acid formed after dissolving in benzene by means of about one mol of phosphorus pentachloride into the corresponding acid chloride and condensing the acid chloride by means of about 2 mols of aluminium chloride into a 2-alkoxy-6-halogen-acridone, heating the latter after suspending in chlorobenzene with about one mol of phosphorus pentachloride to form a 2-alkoxy-6-halogen-9-chloro-acridine.

6. The process which comprises boiling one mol of a 2.4-dichloro-benzoic acid with about one mol of a 4-alkoxy-aniline in amylalcohol in the presence of about one mol of an alkali metal carbonate and a small amount of copper bronze, transforming the 4-alkoxy-3'-chloro-diphenylamine-6'-carboxylic acid formed after dissolving in benzene by means of about one mol of phosphorus pentachloride into the corresponding acid chloride and condensing the acid chloride by means of about 2 mols of aluminium chloride into a 2-alkoxy-6-chloro-acridone, heating the latter after suspending in chlorobenzene with about one mol of phosphorus pentachloride to form a 2-alkoxy-6.9-dichloro-acridine.

7. The process which comprises boiling one mol of a 2.4-dichloro-benzoic acid with about one mol of a 4-methoxy-aniline in amylalcohol in the presence of about one mol of an alkali metal carbonate and a small amount of copper bronze, transforming the 4-methoxy-3'-chloro-diphenylamine-6'-carboxylic acid formed after dissolving in benzene by means of about one mol of phosphorus pentachloride into the corresponding acid chloride and condensing the acid chloride by means of about 2 mols of aluminium chloride into a 2-methoxy-6-chloro-acridone, heating the latter after suspending in chlorobenzene with about one mol of phosphorus pentachloride to form a 2-methoxy-6.9-dichloro-acridine.

8. As new products the compounds of the probable formula:

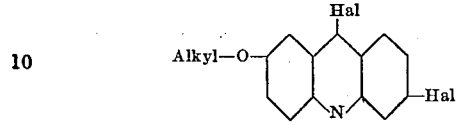

wherein Hal stands for a halogen atom, said products being yellow, crystalline substances of weakly basic character, insoluble in water, soluble in the customary organic solvents.

9. As new products the compounds of the probable formula:

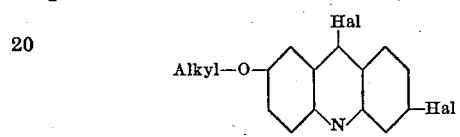

wherein "Alkyl" stands for an alkyl group containing up to 2 carbon atoms and Hal stands for a halogen atom, said products being yellow, crystalline substances of weakly basic character, insoluble in water, soluble in the customary organic solvents.

10. As new products the compounds of the probable formula:

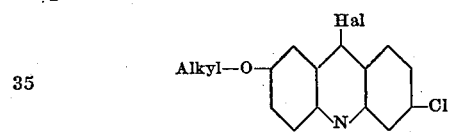

wherein Hal stands for a halogen atom, said products being yellow, crystalline substances of weakly basic character, insoluble in water, soluble in the customary organic solvents.

11. As new products the compounds of the probable formula:

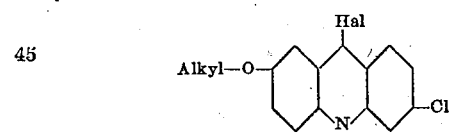

wherein "Alkyl" stands for an alkyl group containing up to 2 carbon atoms and Hal stands for a halogen atom, said products being yellow, crystalline substances of weakly basic character, insoluble in water, soluble in the customary organic solvents.

12. As a new product the compound of the probable formula:

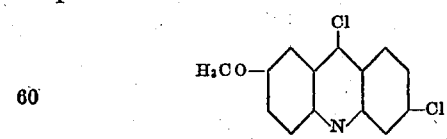

said product crystallizing in yellow needles of the melting point 160–161° C., which is fairly readily soluble in alcohol, benzene, toluene and glacial acetic acid, more difficultly soluble in ether, acetone and ligroin, insoluble in water.

13. As a new product the compound of the probable formula:

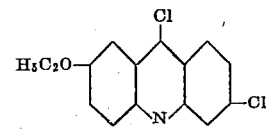

said product crystallizing in yellow needles of the melting point 162–163° C., which is fairly readily soluble in alcohol, benzene, toluene and glacial acetic acid, more difficultly soluble in ether, acetone and ligroin, insoluble in water.

14. As a new product the compound of the probable formula:

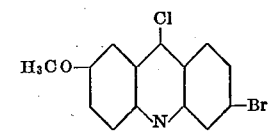

said product crystallizing in yellow needles of the melting point 160–161° C., which is fairly readily soluble in alcohol, benzene, toluene and glacial acetic acid, more difficultly soluble in ether, acetone and ligroin, insoluble in water.

In testimony whereof, I affix my signature.

HANS MAUSS.